United States Patent [19]

Parnell, Sr. et al.

[11] Patent Number: 5,895,192

[45] Date of Patent: Apr. 20, 1999

[54] APPARATUS AND METHOD FOR REMOVING AND TRANSPORTING ARTICLES FROM MOLDS

[75] Inventors: Phillip King Parnell, Sr.; Michael Litwin; Victor Lust, all of Jacksonville, Fla.

[73] Assignee: Johnson & Johnson Vision Products, Inc., Jacksonville, Fla.

[21] Appl. No.: 08/654,399

[22] Filed: May 28, 1996

Related U.S. Application Data

[63] Continuation-in-part of application No. 08/431,884, May 1, 1995, which is a continuation-in-part of application No. 08/258,267, Jun. 10, 1994, abandoned.

[51] Int. Cl.⁶ ........................................................ B65G 47/74
[52] U.S. Cl. .......................... 414/225; 414/752; 198/409; 198/468.4; 198/468.9; 901/8
[58] Field of Search ................................ 414/225, 729, 414/737, 744.5, 749, 752, 793, 797; 904/7, 8, 40; 198/409, 375, 432, 468.4, 468.9

[56] References Cited

U.S. PATENT DOCUMENTS 4,576,560  3/1986  Herman ................................ 414/225
4,611,749  9/1986  Kawano .................................. 901/8 X
4,768,919  9/1988  Bergman et al. ..................... 901/40 X
4,773,523  9/1988  Hansen, Jr. et al. .................. 901/7 X

*Primary Examiner*—Donald W. Underwood

[57] ABSTRACT

An apparatus and a method for removing and transporting articles from molds. More specifically, the present invention pertains to such an apparatus and method which is particularly well suited for removing the articles from a molding machine having molds in which they are molded, and thereafter carrying the articles within a very short period of time away from the molds and depositing the articles for further processing in a high speed, automated production system. The apparatus removes and transports articles, such as ophthalmic contact lens mold sections or contact lens packaging elements, from a molding station whereby an operating assembly removes the articles from the molding station and transports these in a composite motional displacement enabling rapid conveyance thereof to a first location; a pivotable robotic parts handling element being adapted to receive the articles from the first location and transport these to a further or second location for deposition onto pallets or the like and the continued transport thereof to a treatment or processing facility for producing and/or packaging of the contact lenses.

25 Claims, 13 Drawing Sheets

APPARATUS AND METHOD FOR REMOVING AND TRANSPORTING ARTICLES FROM MOLDS

CROSS-REFERENCE TO RELATED APPLICATIONS

This application is a continuation-in-part of U.S. Pat. application Ser. No. 08/431,884, filed May 5, 1995 which is a continuation-in-part of U.S. patent application Ser. No. 08/258,267 filed Jun. 10, 1994, now abandoned (Attorney Docket Nos. VTN-78 and VTN-192).

BACKGROUND OF THE INVENTION

1. Field of the Invention

The present invention relates, in general, to an apparatus and a method for removing and transporting articles from molds. More specifically, the present invention pertains to such an apparatus and method which is particularly well suited for removing the articles from a molding machine having molds in which they are molded, and thereafter carrying the articles within a very short period of time away from the molds and depositing the articles for further processing in a high speed, automated production system.

2. Description of the Prior Art

Recently, attention has been directed by industry toward economically forming large quantities of high-quality contact lenses in a precisely operating, high-speed automated molding system. In such a lens molding system, each lens is formed by sandwiching a monomer in an interspace which is present between front and back mold sections, normally identified as, respectively, front and base or back curves. The monomer is polymerized to form a contact lens, which is then removed from the mold sections, further treated and then packaged for consumer use.

The mold sections used in the above-mentioned process may themselves be formed through the intermediary of injection molding or compression molding processes. These mold sections may be made from the family of materials consisting of thermoplastics; for example, preferably such as polystyrene, which has been determined to constitute an excellent material for making these mold sections. Polystyrene does not chemically react with the hydrophilic material normally employed to make the contact lenses; for instance, such as hydroxyethylene methacrylate (HEMA), therefore, it is possible to form very high quality contact lenses of that type of material in polystyrene molds. In addition, polystyrene is widely available in industry and commerce and, as a result, is relatively inexpensive. Because of the ease and low cost with which polystyrene mold sections may be produced and then employed to mold contact lenses, each pair of complementary front and base curve polystyrene mold sections is typically used only a single time in order to mold only one contact lens, and may then be discarded or the polystyrene disposed of recycled for other uses.

In the above-discussed automated contact lens production system, it is desirable to eliminate or to minimize any exposure to oxygen of the hydrophilic monomer used for the manufacture of the contact lenses. Correspondingly, it is desirable to eliminate or minimize the exposure of the lens mold sections to oxygen. Therefore, when the polystyrene mold sections are formed and then used for the purpose of making contact lenses in the above-discussed manner, it is desirable to rapidly transfer these mold sections from the mold in which they are made to a low oxygen (preferably nitrogen) environment. It has been difficult to achieve the desired transfer speed with conventional robot assemblies or controls because presently available robots do not move with adequate rapidity and precisely enough to enter into and exit from the molding apparatus at the desired rate of speed in effectuating the removal of the molded articles. In particular, if these robots are operated at the necessary rate of speed, they tend to waffle and shake or vibrate undesirably as they come to a sudden stop, and the movements of the robot are resultingly not sufficiently precise. On the other hand, if the robots are slowed down so as to be able to move more precisely, the robots no longer possess the desired speed to facilitate the contact lens mass-producing process.

Moreover, in the above-mentioned automated contact lens production system, the contact lens mold sections may not be fully solidified when they are ejected or removed from the mold in which they are formed. It is, therefore, important that any robot or apparatus which is used to carry the contact lens-forming mold sections away from that mold will not interfere so as to adversely affect the desired optical qualities of the contact lens mold sections. In particular, it is important that any such robot or apparatus be capable of absorbing the kinetic energy of the lens mold sections as they are being transferred to such transporting robot or apparatus without deleteriously altering the shape, form or dimensions of the lens mold sections. The robot or conveying apparatus employed must, likewise, be able to transport the lens mold sections in a manner that permits those lens mold sections to cool and completely harden in a desired manner.

In addition, in order to maximize the optical quality of the contact lenses, it is preferred that the optical surfaces of the front and base curve polystyrene mold sections; that is, the surfaces of those mold sections which touch or lie against the hydrophilic monomer as the lens preform is being molded, not be engaged or contacted by any mechanical handling equipment while the mold sections are being transported by and positioned in the lens molding system.

In order to achieve the foregoing kind of transport system, pursuant to the disclosure of copending U.S. Pat. application Ser. No. 08/258,267, now abandoned (Attorney Docket No. VTN-78), there is described an apparatus for removing and transporting ophthalmic or contact lens mold sections from a mold, and which generally comprises first, second and third assemblies. The first assembly removes the lens mold sections from the mold and transports the lens mold sections to a first location, the second assembly receives the lens mold sections from the first assembly and transports the lens mold sections to a second location, and the third assembly receives the lens mold sections from the second assembly and transports the lens mold sections to a third location. Preferably, the first assembly comprises a hand including vacuum structure to receive the lens mold sections from the mold and to releasably hold the lens mold sections, and a support subassembly connected to the hand to support the hand and to move the hand between the mold and the first location. The second assembly preferably includes a support frame, a platform to receive the lens mold sections from the first assembly and supported by the support frame for movement between the first and second locations, and moving means for moving the platform along the support frame and between these first and second locations. The preferred design of the third assembly includes a transport subassembly and a support column. The transport subassembly receives the lens mold sections from the second assembly, releasably holds those lens mold sections, and carries the lens mold sections to the third location; and the support column supports the transport subassembly for movement between the second and third locations.

In an effort designed to simplify and provide further improvements on the foregoing transport apparatus, alternative embodiments have been developed more recently, as disclosed in copending U.S. Pat. application Ser. No. 08/431,884 (Attorney Docket No. VTN-192), which discloses an apparatus for removing and transporting articles, such as ophthalmic contact lens mold sections, or primary contact lens packaging elements, such as the base members of blister packages, from a mold. The apparatus, in one embodiment thereof, which is employed in the manufacture of lens mold base curves, includes first, second, and third assemblies; the first of which removes the articles from the molding station at a first location and transports them to a second location; the second assembly receives the articles from the first assembly and transports them to a third location, and the third assembly receives the articles from the second assembly and transports them to a fourth location. A second embodiment of the apparatus which is used in the forming of lens mold front curves additionally includes a flipper assembly disposed between the first and second assemblies, which flipper assembly receives the articles from the first assembly and inverts them before depositing them onto the second assembly. This second embodiment is useful in conjunction with molded articles which are transported to the flipper assembly in an inverted position. A third embodiment, which produces primary packaging components, such as the base members of blister packages for housing the contact lenses, includes second and third assemblies which further include means for altering the relative spacing between the articles while the articles are being transported.

Although the foregoing embodiments and operative versions of the apparatus, as elucidated in the aforementioned copending U.S. patent applications, of which the present application is a continuation-in-part, are employable in providing the molded components constituting mold sections for forming contact lenses, and also primary package elements for contact lenses, such as the contact lens-receiving base members of blister packages, the numerous operating and transfer assemblies and stations which are required for transporting the molded components at high rates of speed from the molding installation in which they are formed to their ultimate depositions onto pallets for further treatment, such as in a low oxygen or nitrogen atmosphere, are of considerable complexity, subject to waffling and vibration and rendering the efficacy of producing acceptable articles difficult to maintain as a result of the multiplicity of operative apparatus components, and transfer and transport paths employed in the various apparatus embodiments.

SUMMARY OF THE INVENTION

Pursuant to the present invention, there is contemplated the provision of an apparatus of the type described which advantageously incorporates simplified concepts in the transfer and transporting of high quality articles which have been molded, such as contact lens mold sections and primary package elements for contact lenses in a high-speed operation through a significant reduction in movable apparatus components and transfer assemblies between the molding apparatus and an ultimate conveyance, such as a pallet, for transporting these molded articles into a nitrogen or low oxygen environment or other desired location for further processing.

An object of this invention is to provide an improved and simplified apparatus for removing and transporting articles from molds.

Another object of the present invention is to provide a novel apparatus able to rapidly remove molded articles, which may not yet be completely cured or hardened, from a mold and to carry those articles away from that mold without causing undue plastic deformations of the articles.

Yet another object of the present invention is to provide a high speed apparatus for removing fragile thermoplastic articles from a mold in which those articles are made, and then transporting those articles through the implementation of precise composite motions, and depositing those articles in a high speed, automated manufacturing system in the absence of any shocks or vibrations being encountered by the apparatus.

A further object of this invention is to remove and transport articles made from the family of thermoplastics, such as polystyrene, from a mold in which those articles are made through the intermediary of sophisticated robotics, into a low oxygen environment of an automated contact lens molding system, within a period or time interval of only a few seconds.

A still further object of the present invention is to provide an apparatus having the capability to remove a plurality of discrete molded articles from a mold with the molded articles arranged in a matrix array, and to selectively either preserve that matrix array during subsequent handling of the molded articles, or reorient the matrix and the relative spacing of the molded articles therein according to a second predetermined matrix prior to being transported to a further locale.

Yet another object is to provide a method of removing and transporting molded articles from a molding apparatus towards further processing locales, utilizing the apparatus pursuant to the present invention.

The foregoing and other objects are attained through the provision of an apparatus for removing and transporting articles, such as ophthalmic contact lens mold sections or contact lens packaging elements, from a molding station whereby an operating assembly removes the articles from the molding station and transports these in a composite motional displacement enabling rapid conveyance thereof to a first location: a pivotable robotic parts handling element being adapted to receive the articles from the first location and transport these to a further or second location for deposition onto pallets or the like and the continued transport thereof to a treatment or processing facility for producing and/or packaging of the contact lenses.

Pursuant to a modified embodiment, the pivotable robotic parts handling element which contains a pivotable and vertically displaceable arm for transporting the molded articles from the first location to the second location includes operative structure for inverting the pivotable arm so as to relatively invert the articles picked up at the first location prior to depositing the articles onto pallets at the second location.

According to a further embodiment, operative structure is provided proximate the first location for altering the relative spacing or matrix in the array between the articles to which the articles have been transported from the molding station and with the pivotable and vertically reciprocatable arm member of a robotic parts handler being adapted to pick up the articles in their altered relative spacings for conveyance to the second location and deposition onto pallets transportable to further processing facilities.

BRIEF DESCRIPTION OF THE DRAWINGS

Further features and advantages of the invention will become more readily apparent from a consideration of the following detailed description set forth with reference to the accompanying drawings, which specify and show preferred embodiments of the invention; and in which.

DETAILED DESCRIPTION OF THE PREFERRED EMBODIMENTS

Figure 1:
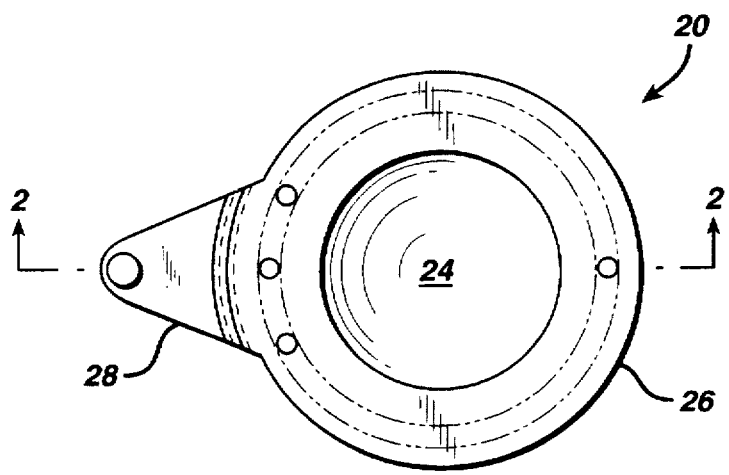
FIG. 1 illustrates a plan view of a base or back curve adapted to be removed and transported from a molding machine by the inventive apparatus.

Disclosed hereinbelow are embodiments of an apparatus which relate to the removal of molded articles which are used in the fabrication and/or packaging of contact lenses, and which are transported at regular intervals from a molding installation to a first location, and thereafter to a second location for the subsequent disposition of the articles, such as deposition onto pallets on a conveyor system for further treatment or processing. As such, the present application incorporates, by reference, the specification and disclosure of U.S. Pat. application Ser. No. 08/258,654 to Martin, et al., now U.S. Pat. No. 5,804,107 (Attorney Docket No. VTN-0092) for "Consolidated Contact Lens Molding." The present invention is particularly suited for carrying out the above-identified functions in the transporting of the molded articles in an improved manner and simpler mode than through the use of prior or currently employed devices and assemblies. The following descriptions, with references to the corresponding drawing figures as detailed hereinbelow, set forth the salient features and elements of essentially three distinct but inventively interrelated embodiments of the present invention: the first embodiment being directed to the removal from a molding installation and transportation of back curve mold halves for the formation of ophthalmic or contact lenses; the second embodiment being directed to the removal and transportation of front curve mold halves which are designed to eventually mate with the back curves; and the third embodiment being directed to the removal from the molding installation and transportation of molded contact lens packaging elements, such as the base members for contact lens blister packages.

The process of fabricating contact lenses, in a manner regarding which the present invention is extremely useful, comprises creating a pair of mold halves, between which a liquid monomer may be disposed, shaped into a lens, and subsequently irradiated to prompt sufficient crosslinking to impart appropriate structural integrity to the lens. The mold half sections which are used in creating the lenses are themselves molded; the molding process being especially intolerant of irregularities to the optical perfection required of the surfaces. The mold sections are created in a rapid injection molding machine which produces a multiplicity of mold sections every six seconds.

The molding machine 10, as illustrated diagrammatically in the various drawings, comprises two opposing elements 12, 14 which interface to shape the mold halves; one element having an array of regularly spaced concave recesses, the opposing element having a corresponding array of convex protuberances, and with concave recesses and convex protuberances defining, therebetween, a shaped volume for producing mold half sections. A more detailed description of the molding machine, in conjunction with which the present invention is utilized, may be found in copending U.S. Pat. application Ser. No. 08/257,785, now U.S. Pat. No. 5,540,410 for "Mold Halves and Molding Assembly for Making Contact Lenses" (Attorney Docket No. VTN-079), the disclosure of which is incorporated herein by reference.

In operation, the opposing elements 12, 14 come together, the material of the mold halves; for example, molten polymer, is injected into the shaped volumes between the surfaces of the opposing elements, and the mold halves are held for a period of time sufficient to set their shapes.

Figure 2:
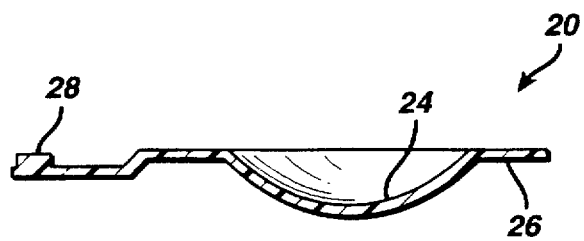
FIG. 2 illustrates a sectional view taken along line 2—2 in FIG. 1.

FIGS. 1 to 4 show, respectively, base or back and front curve mold sections 20, 22 which are used in the manufacture of contact lenses. FIGS. 1 and 2 are top and side views, respectively, of a back curve mold section 20; which includes a central lens shaping curved portion 24, an annular flange portion 26, and a tab 28. Because, in the case of the back curve, the central curved portion is used to form or shape the back curve or surface of a contact lens, it is desirable to minimize direct contact therewith; the flange and tab portions are, therefore, used to facilitate handling and positioning of the molded article. The simultaneous molding of the curve surface with the annular flange 26 and tab portions 28 has an additional manufacturing benefit in that it optimizes the injection molding process.

Preferably, the mold sections are each integrally molded from a plastic material from the family of thermoplastics such as polystyrene or another suitable material; and preferably each mold section has a thickness, typically 0.8 mm and 0.6 mm, respectively, and rigidity such that the mold section effectively transmits light and withstands prying forces applied to separate the mold sections from the mold in which those sections were made. The mold sections are also described in detail in the above-referenced copending U.S. Pat. application Ser. No. 08/257,785.

Once the shape of the mold half has been set, the opposing elements of the molding machine separate and the mold halves may be removed. The back curve mold halves are referred to as such because they provide the convex optical mold surface which shapes the portion of the contact lens which contacts the eye, whereas the front curve mold halves are so called, because they provide the concave optical surface which molds the front face of the lens. In accordance with methods set forth to maintain optimal optical surface integrity, the molding machine 10 which produces the back curve mold sections is designed specifically so that upon separation of elements 12 and 14, the non-optically relevant, concave surfaces of the mold halves are exposed (the convex surfaces remaining within the concave recesses). While the machine which produces the front curve mold sections 22 each having portions 32, 34 and 36 analogous to portions 24, 26 and 28 of the back curve molds 20, is identical in nearly every functional aspect to the above-described back curve mold half producing machine, when the opposing elements of the front curve molding machine separate, the front curve mold sections remain in contact with the convex protuberances. In either case, it is once the opposing elements of the molding machine have separated that the molded articles may be removed.

Although referred to hereinabove with regard to mold sections which are utilized to ultimately produce the ophthalmic or contact lenses, the invention is also applicable to the production of the base members 30 of blister packages, as shown by way of example in FIG. 5, which are intended to provide the primary packaging for the formed contact lenses at some subsequent point during the production cycle. Consequently, with respect to the third embodiment of the inventive apparatus, this in essence is similar in functioning to that of the first embodiment with various modifications thereof, as detailed hereinbelow.

(A) Transportation of Base Curves by Apparatus

The first embodiment 40 of the inventive apparatus as shown in the plan view of FIG. 6 and FIGS. 7 through 12, and as described hereinbelow, accordingly, is directed to the removal and rapid and non-damaging transport of the back curve contact lens mold halves 20 from the molding machine 10 to a remote location; for example, to a pallet transportable on a belt conveyor of a contact lens fabrication assembly line, as described further on herein.

Figure 6:
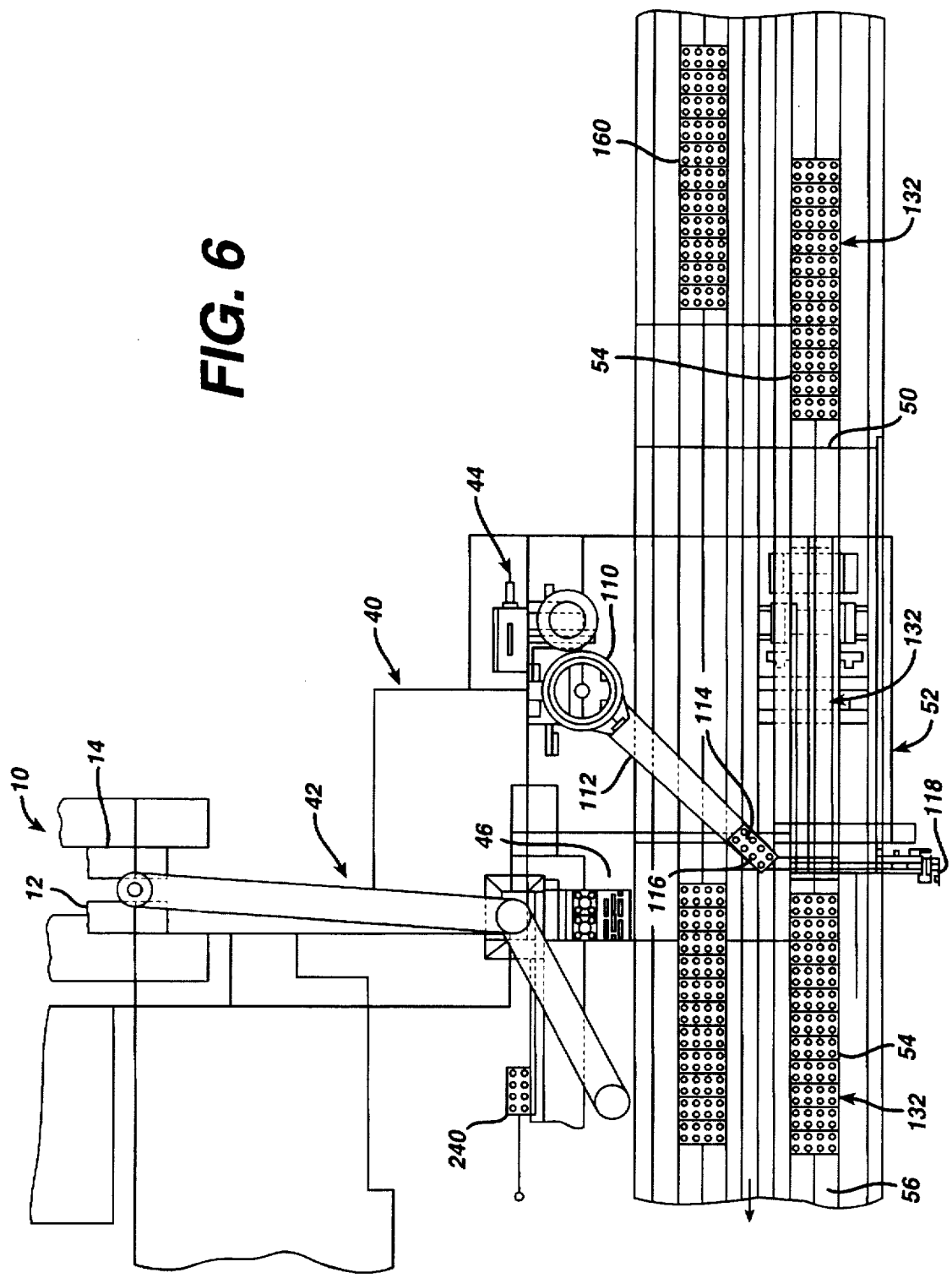
FIG. 6 illustrates a schematic plan view of a first embodiment of the apparatus utilized for the transport of base curves.

More particularly, referring to the diagrammatic illustration of FIG. 6, the apparatus 40 includes first and second material handling assemblies 42 and 44. The first assembly 42 is provided for removing the molded articles 20 from the molding machine 10 and transporting the articles to a first location at 46. The second assembly 44 is positioned for receiving the molded articles 20 from the first assembly 42 and transporting the articles from the first location 46 to a second location. A transport conveyor 50 is provided for receiving the articles 20 from the second assembly 44 and, in essence, comprises the second location 52 at which; for example, pallets 54 which are sequentially transportable on the conveyor upper belt run 56 have the articles 20 deposited thereon so as to position the articles in recesses in the pallets, and are advanced to suitable installations, for instance, a nitrogen atmosphere-containing chamber, for further processing or treatment.

Figure 7:
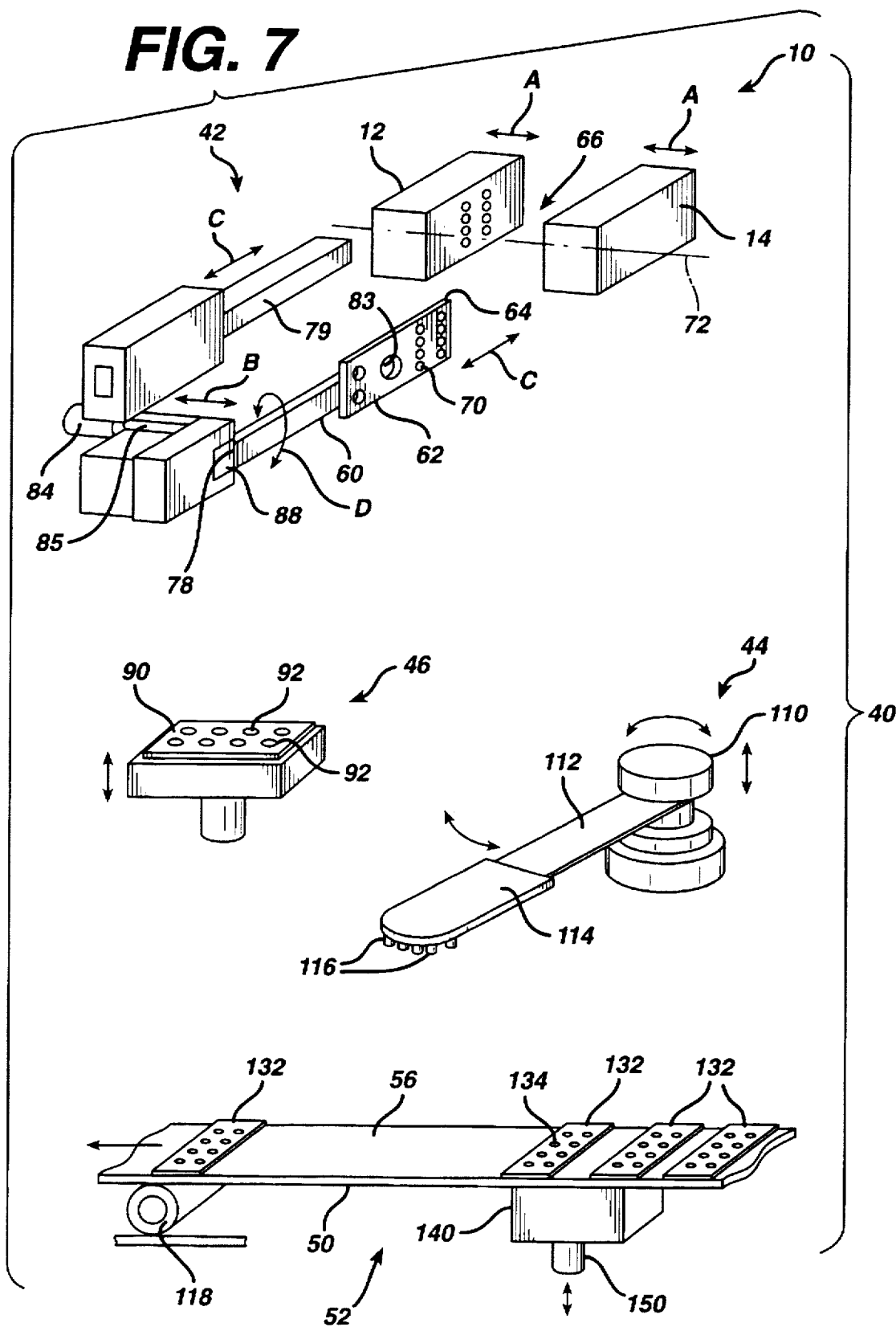
FIG. 7 illustrates a diagrammatic perspective view of the apparatus of FIG. 6.
Figure 8:
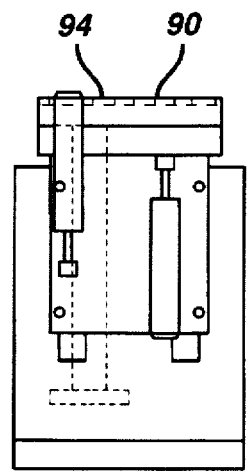
FIGS. 8, 9 and 10 illustrate, respectively, front, side and top views of a nesting arrangement for receiving base curves from a first transfer assembly shown in FIGS. 6 and 7.
Figure 9:
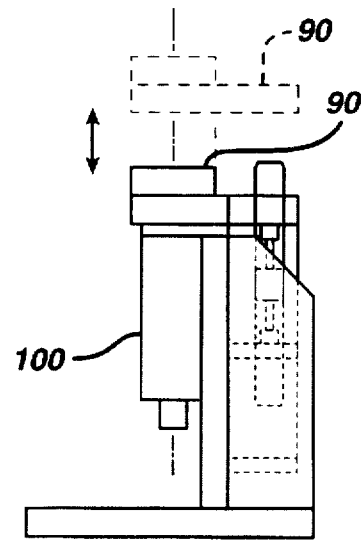

The first assembly 42, as particularly illustrated in the drawing FIGS. 6 and 7, is provided with an arm member 60 which has one free end thereof equipped with a plate 62 having vacuum head 64 for receiving the molded articles 20 when the molding machine 10 has the elements 12, 14 separated so as to form an opening 66 enabling insertion therein of the head 64 of the vacuum structure, the latter of which amounts an array of a plurality of article pick-up cups 70 of a resilient material which communicate with a vacuum source (not shown).

The arm member is mounted so as to be reciprocable transversely of the axis 72 of the molding machine 10, whereby the axis 72 is defined as extending along the direction of the opening or closing of the molding machine elements 12, 14, such operative movement being effected in the direction of arrow A.

Connected to a structure 85 supporting the opposite end 78 of arm member 60 is a structure mounting a drive motor 84 which is operative so as to impart a reciprocable movement to the structure mounting the arm member in a manner in parallel with the axis of movement of the elements 12, 14 of the molding machine 10, in essence, along the direction of arrow B paralleling axis 72 and arrow A, with the entire first assembly 42 being supported by this drive motor supporting structure.

The movement of the arm member 60 and the plate 62 mounting vacuum head 64 and cups 70 of the structure in the direction of arrow C transversely of axis 72 of the molding machine 10; i.e., along the longitudinal axis of the arm member 60, may be effectuated by means of a suitable belt conveyor 79 operable by means of motor 86, whereas the direction in parallel with the movement of the elements 12, 14 of the molding apparatus, in essence, along arrow A, is by means of drive motor 84, which may be a so-called "kick motor," and effectuated by means of a cooperating roller and guide rail structure 85.

Furthermore, the end of the arm member 60 distant from that mounting the vacuum head plate 64 and the cups 70 for picking up the molded articles 20 from the molding machine 10 is connected to a rotary joint 88 forming part of the overall first assembly 42 and includes a drive motor 87 so as to enable the arm member 60 to be pivoted about its longitudinal axis as shown by D, and resultingly vacuum plate 62 to be either vertically oriented, as shown in drawing FIG. 7, when in a state of waiting and then being moved into the opening 66 between the molding machine elements 12, 14 for picking up molded articles 20, or rotated 90° into a horizontal orientation to face downwardly upon being retracted into the position at the first location 46 where the articles 20 are adapted to be deposited on a pallet-like nest 90 having recesses 92 from which they are then picked up by a rotary parts handler comprising a component of the second assembly 44, as described below, for transfer to the second location 52.

The ability of the arm member 60 and the vacuum head 64 thereon to be reciprocably moved in two orthogonal directions; in essence, transversely along the direction of arrows C, and in parallel with the direction of the opening 66 along axis 72, i.e., arrows A, between the molding machine elements 12, 14, shown by arrow B, enables the structure of the arm member 60 and plate 62 to be constructed relatively thin in thickness and with lightening holes 83 formed therein resulting in a reduced mass, thereby lowering potential vibrations and any "jerking" motions of the movable components. This increases the accuracy in operation and precision in picking up and transporting the molded articles 20 from the molding machine 10 to the first location 46.

The drive motor 84 which imparts the motion to the arm member 60 which is in a direction in parallel with the opening 66 between the molding machine elements 12, 14 may be programmed to assume various degrees of arm displacement, such as from zero to a predetermined displacement distance as a function of the mold article type and required size of opening 66. This adjustability in the prepositioning caused by the "kick motor" 84 is necessary so that different designs of molded articles can be produced with a minimum waiting and motion time after mold opening. Consequently, upon the opening of the mold elements 12, 14, in order to be able to remove the molded articles 20 from the molding machine 10, prior thereto the arm member 66 possessing the vacuum head 64 may have been displaced in parallel so as to enable the cups 70 to be located as closely as possible to the molded articles 20 which are to be removed from the machine, and advanced transversely of the longitudinal axis 72 of the machine along the direction of arrow A into the opening 66 at a minimum clearance, thereby considerably reducing the time which was previously required for insertion of the vacuum head 64 into the opening 66, while concurrently reducing vibration and jerking of the molded articles.

This precision picking action also results in a reduced need for wide mold openings, since the vacuum head 64 enters into any narrowly defined space required within the mold opening 66 rather than necessitating that the opening be widened to its fullest extent as heretofore prior to the insertion of the vacuum head 64 with the suction cups 70 for picking up the molded articles 20.

Thereafter, upon having picked up the molded articles 20 and retraction thereof from the molding machine 10, the arm member 60 is then moved again in reverse sequence towards its original position at the first location 46 while, concurrently, the arm member and vacuum head 60, 64 are pivoted about rotatable joint 88, as shown by arrow D, into a horizontal orientation with the suction cups 70 facing downwardly while retaining the molded articles 20 thereto under the effects of an applied vacuum being moved into vertical alignment above the pallet-shaped nest 90. The nest 90, as shown in FIGS. 7 to 10, is raised by means of a suitable hydraulic or pneumatic actuator 100 to cause recesses 92 formed in an upper surface 94 therein to come into seating contact with the molded articles which are located on the cups 70. The vacuum in the cups 70 is then released and pressure generated to produce a blow off of the articles which causes the molded articles to be positioned in the recesses 92, and the nest 90 with the molded articles is then lowered. This enables the arm member 60 to return to its previous position, as mentioned hereinbefore, to repeat the cycle of removing a successive batch of molded articles 20 from the machine 10 in continuous repetitive sequences.

The second assembly 44 is then operable for the purpose of contacting and picking up the molded articles 20 which are positioned in the upwardly facing recesses of the nest 90, while the first assembly 42 has the arm member 60 possessing the vacuum plate 62 returned into its waiting or standby position adjacent the molding machine 10 and with the vacuum head 64 being rotated into its vertical orientation to enable its entry into the opening thereafter formed between the molding elements 12, 14 in the manner as described hereinabove, facilitating the receipt by the cups 70 of a new batch of molded articles 20, so as to commence a subsequent cycle of operation.

During that period of time, the second assembly 44 is placed into operation as described hereinbelow to pick up the molded articles 20 at the first location 46 from the recesses 92 in nest 90.

Figure 10:
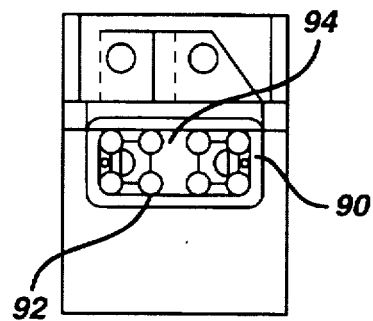

The second assembly 44 essentially comprises a rotary parts handling system, including a Cambot Rotary Parts Handler (registered trademark) manufactured by the Camco Corporation, which includes a rotatable cam-controlled member 110 which is also adapted to vertically reciprocate, and which mounts an elongate arm member 112 extending horizontally therefrom. The distal or free end of the arm member 112 has a head end plate 114 having suction cups 116 positioned thereon, as illustrated in FIGS. 6 and 7, with the array of the suction cups 116 being in correlation with the spacing of the recesses 92 in nest 90, as shown in FIGS. 7 and 10, and which is adapted to be pivoted through an angle of approximately 90° whereby in one position thereof at the first location 46, the arm member 112 has the downwardly depending suction cups 116 located above the nest 90. A vacuum source (not shown) which is connected to the depending suction cups 116, which as mentioned are equal in number to the number of recesses 92 in the nest 90 containing the molded articles 20 are vertically aligned thereover, and the rotary arm member 112 is then lowered by the rotatable member 110 so as to contact the molded articles 20. A vacuum is applied to the suction cups 116 on the plate 114 of the arm member 112 so as to cause the suction cups 116 to engage the articles 20.

The arm member 112 is then raised by the rotatable member 110 and pivoted in a reversely directed horizontal displacement back through an angle of 90° so as to extend into a position wherein the plate 114 with the suction cups 116 retaining the molded articles is located above the upper run 56 of horizontal conveyor belt 50 forming a portion of the second location 52, as shown in FIG. 7.

Figure 11:
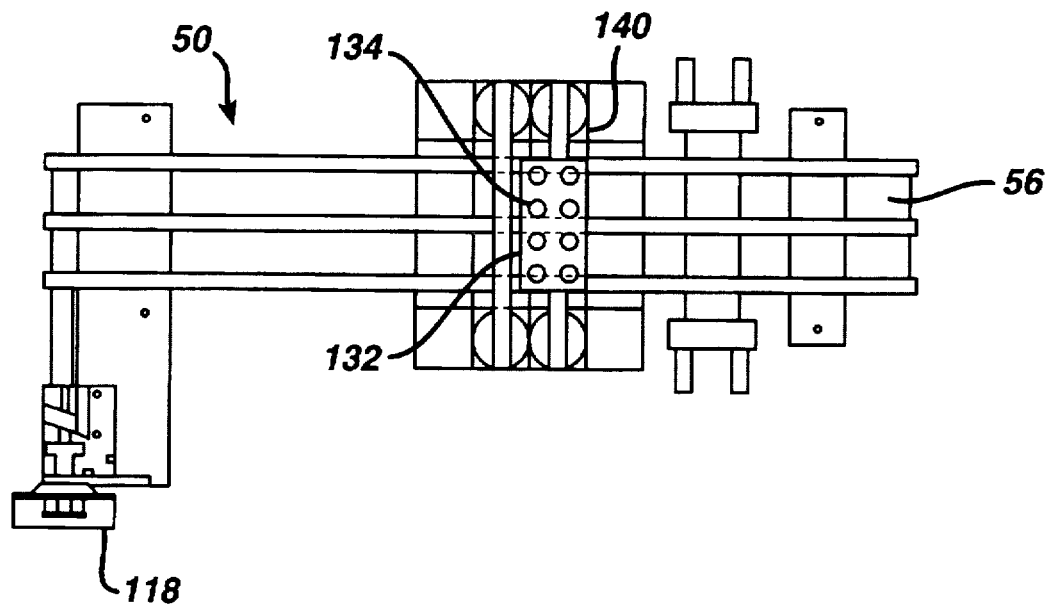
FIGS. 11 and 12 illustrate, respectively, top plan and side views of a conveyor system for receiving base curves from a second transfer assembly shown in FIGS. 6 and 7.
Figure 12:
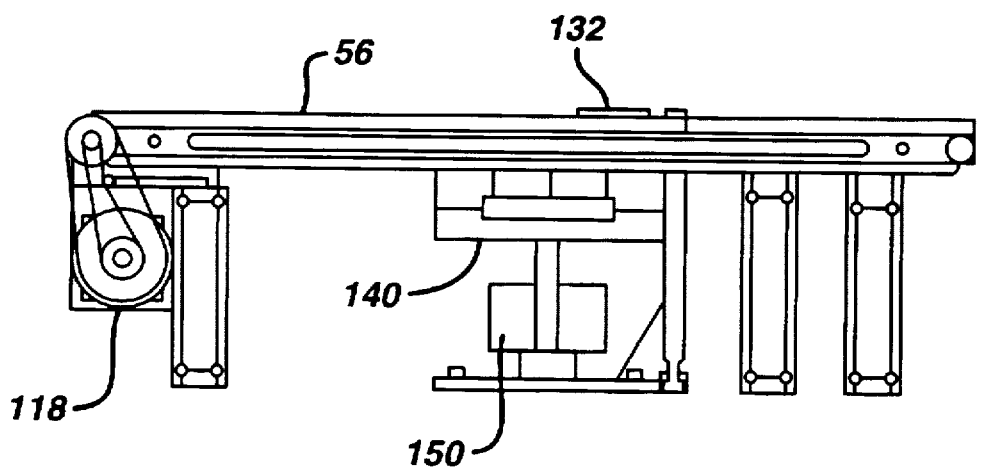
Figure 13:
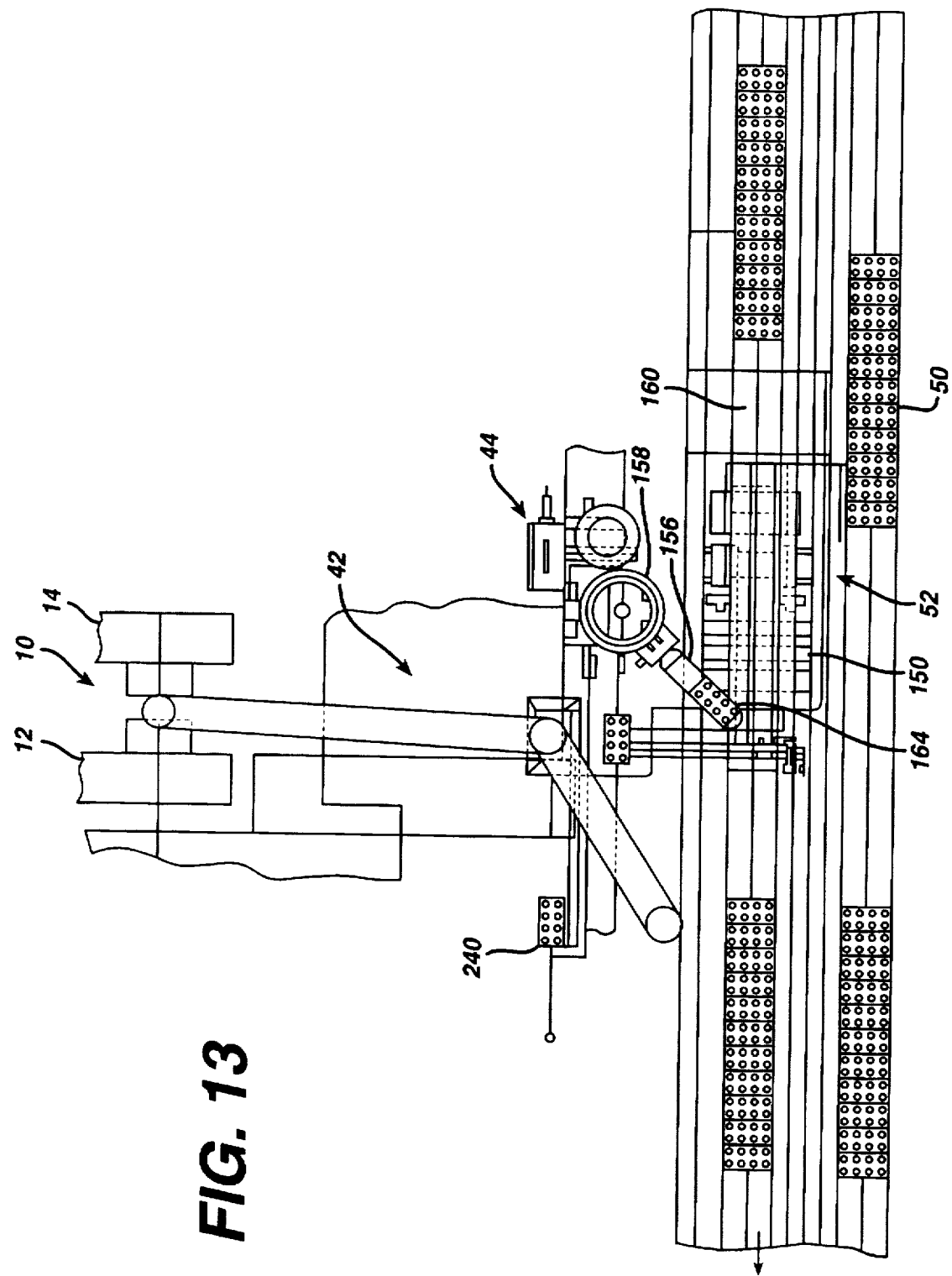
FIG. 13 illustrates a schematic plan view of a second embodiment of the apparatus utilized for the transport of front curves.
Figure 14:
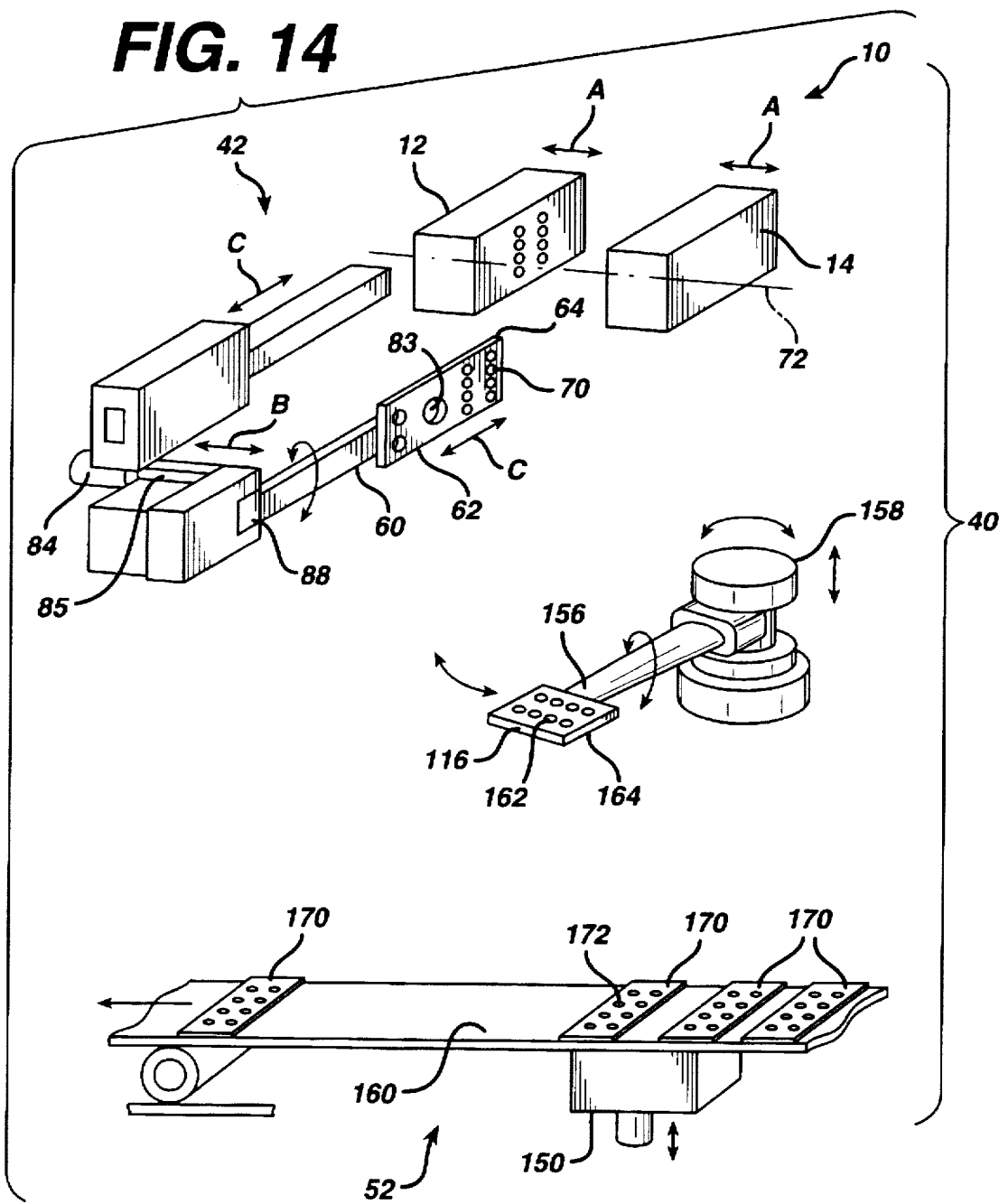
FIG. 14 illustrates a perspective diagrammatic view of the apparatus of FIG. 13.
Figure 15:
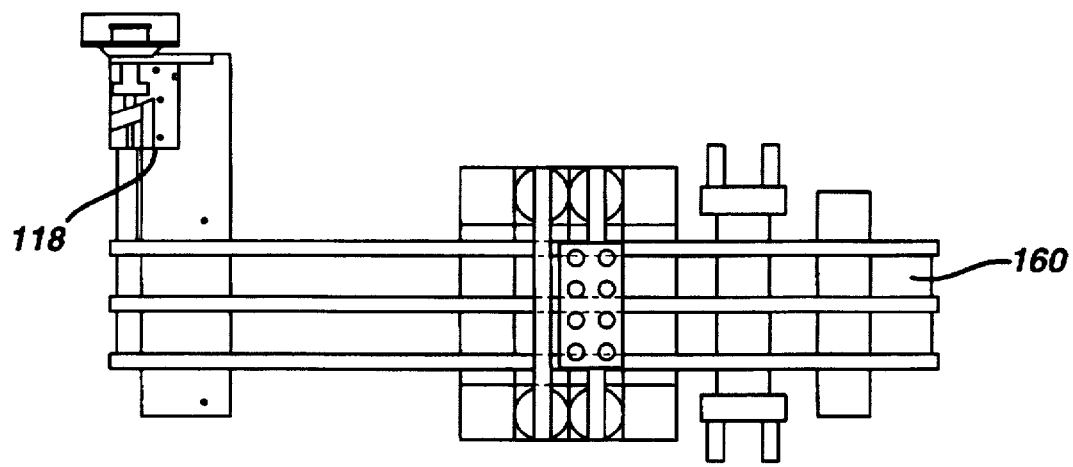
FIGS. 15 and 16 illustrate, respectively, top plan and side views of the conveyor system for receiving front curves from a second transfer assembly shown in FIGS. 13 and 14.
Figure 16:
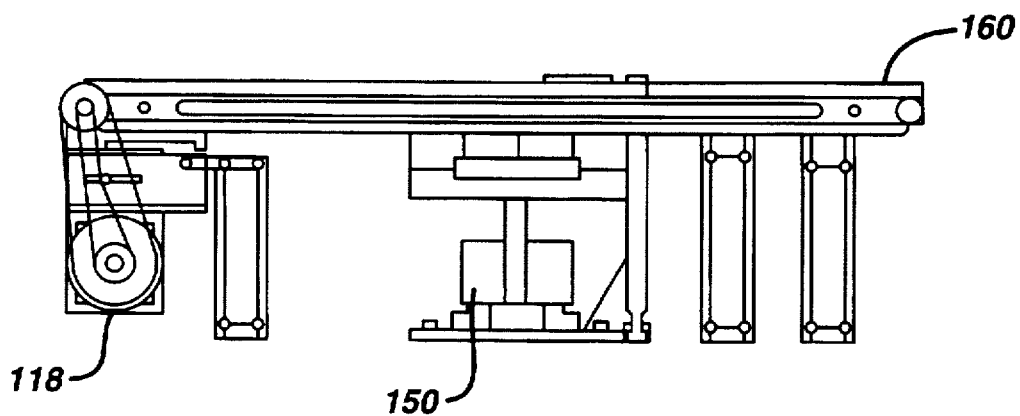
Figure 17:
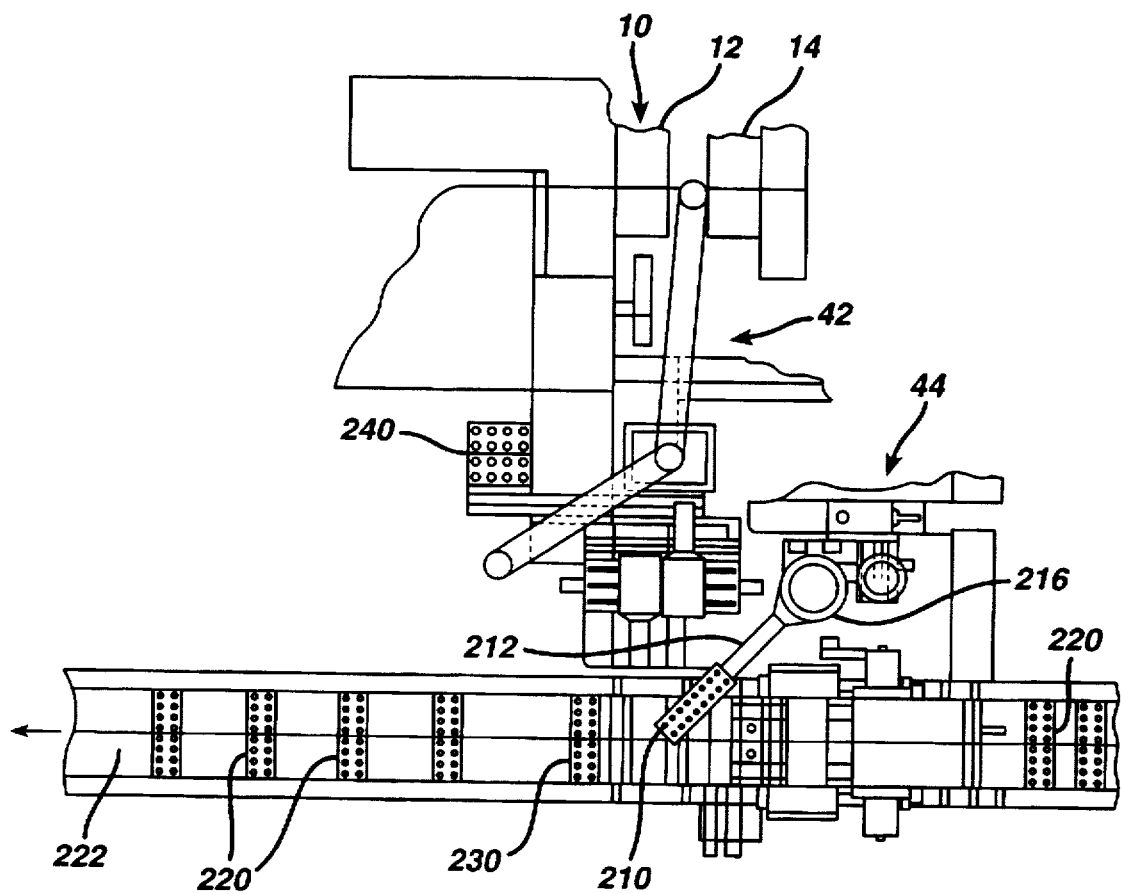
FIG. 17 illustrates a schematic plan view of a third embodiment of the apparatus utilized for the transport of primary packaging base members.
Figure 18:
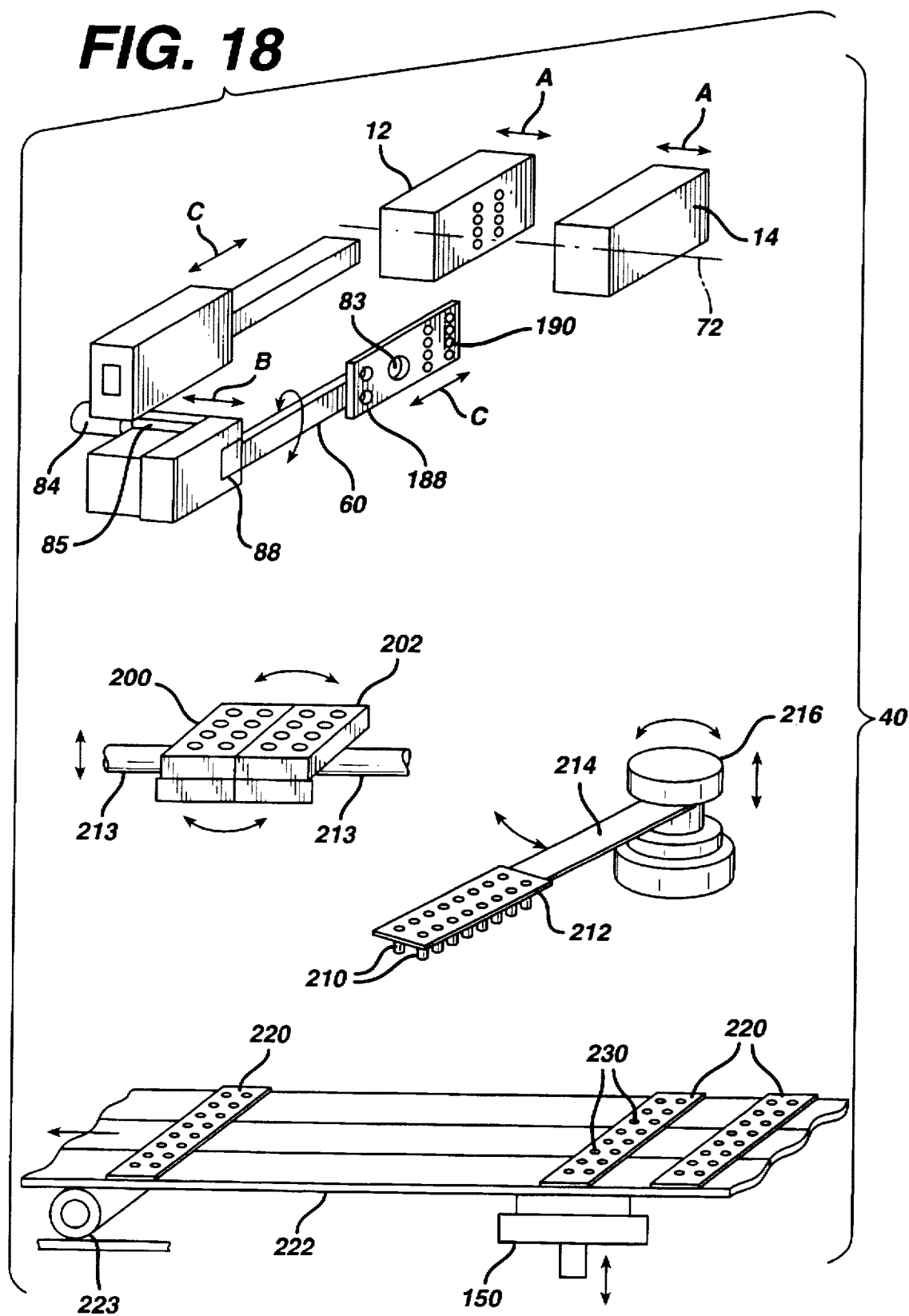
FIG. 18 illustrates a perspective diagrammatic view of the apparatus of FIG. 17.
Figure 19:
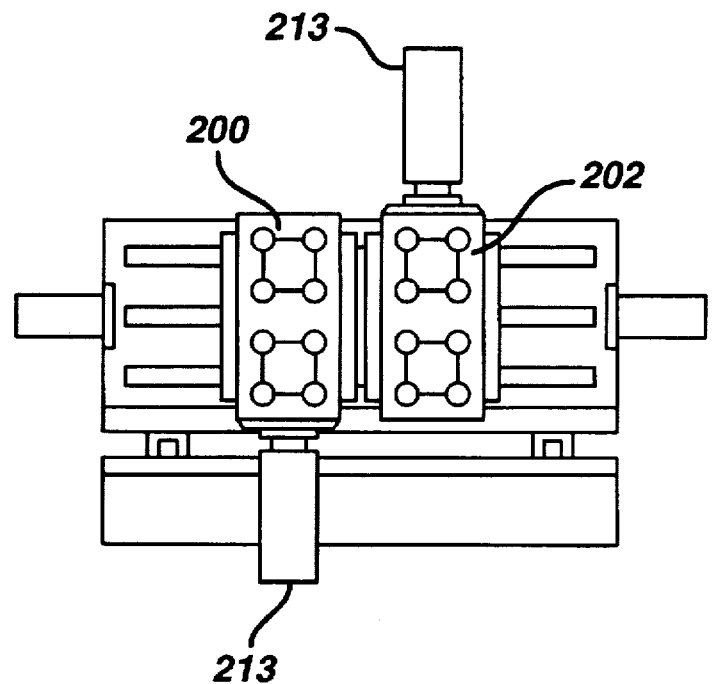
FIGS. 19 and 20 illustrates plan views of a device for rearranging arrays of the base members received from a first transfer assembly in a first orientation and adapted to be picked up by a second transfer assembly in a second orientation for further conveyance.
Figure 20:
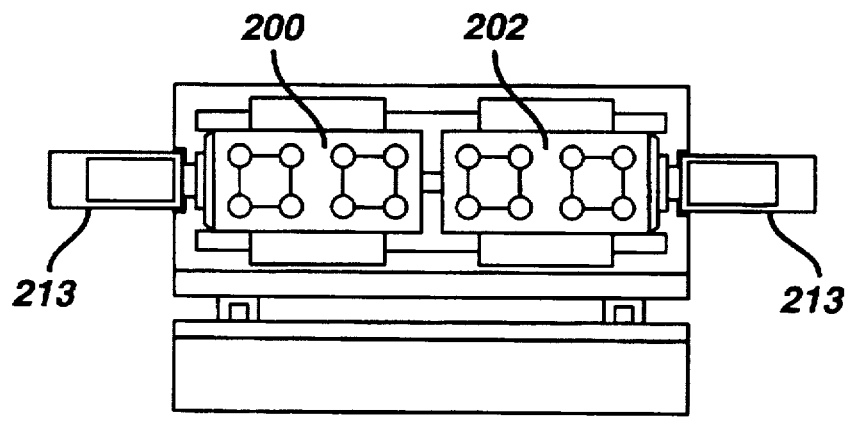
Figure 21:
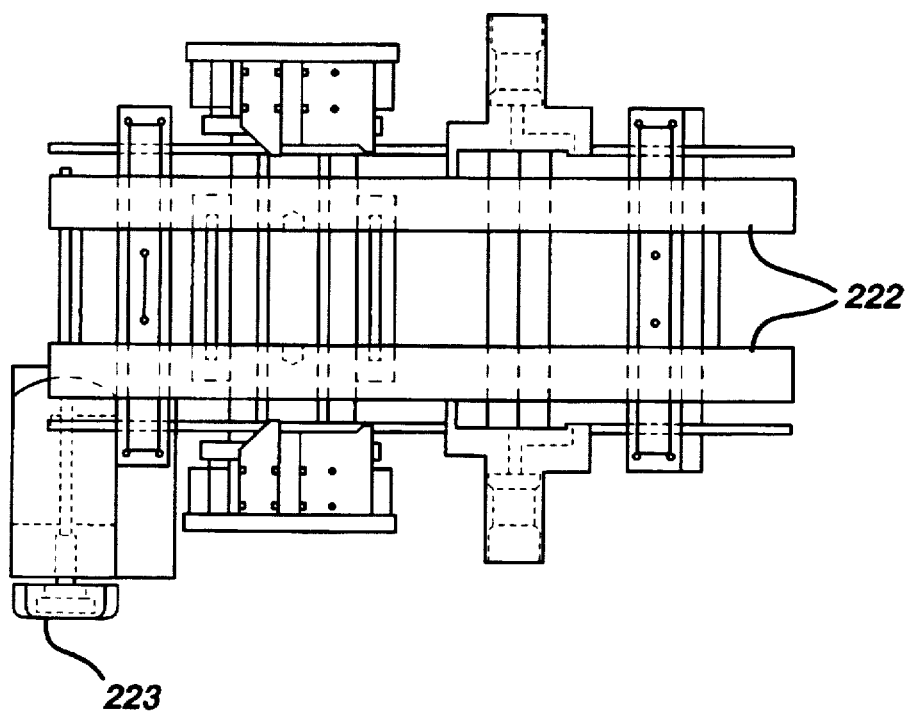
FIGS. 21 and 22 illustrate, respectively, top plan and side views of a conveyor system for receiving base members from the second transport assembly of FIGS. 13 and 14.
Figure 22:
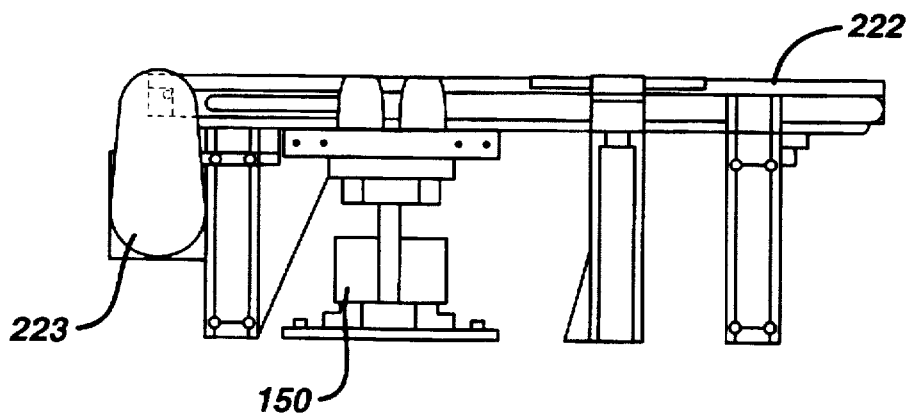

As shown more specifically in FIGS. 11 and 12 of the drawings, the conveyor belt 50 is adapted to be driven through the intermediary of a suitable motor 118 in synchronism with the reciprocatory pivotal movement of the materials handling arm member 112 of the rotary parts handling system of the second assembly 44.

A plurality of pallets 132 each having an array of molded article-receiving recesses 134 are positioned in contiguous sequence at an upstream position 136 relative to the arm member 112 of the rotary parts member 110 on the conveyor belt upper run 56, and are adapted to be individually advanced in spaced succession towards a pick-up station 140 for the molded articles 20, in this instance, the base curves, in synchronism with each pivotal movement of the arm member 112 having the suction cups 116 holding an array of molded articles positioned over the conveyor belt 50, which articles have been previously retrieved from the recesses 92 in the nest 90 at the first location 42.

As the pallets 132 are advanced, they are separated and individually forwarded by an indexing device 140 a single pallet at one time until a leading pallet is positioned directly in alignment below the arm member 112 of the parts handling system which has been pivoted over the conveyor 50, as shown in FIG. 7 of the drawings, with the molded articles 20 being held by the downwardly facing suction cups 116 over the lead in fixture.

At that point, a lifting mechanism 150, which may be either hydraulic or pneumatic, is adapted to raise the pallet 132 upwardly from the upper conveyor belt run 56 to a predetermined extent, while concurrently the arm member 112 of the rotatable cam-controlled member 110 is displaced downwardly so as to enable the cups 116 to deposit the articles or base curves onto the facing recesses 134 formed in the pallet 132 by releasing the vacuum in the cups 116 and, possibly, imparting a slight superatmospheric pressure thereto which will firmly push or blow off the base curves or articles 20 into the recesses 134 of the pallet 132. The pallet is then permitted to be lowered onto the upper conveyor belt run 56, and the arm member 112 of the rotary parts handling system raised and pivoted back towards the nest 90 to enable the pick-up of a subsequent batch of molded articles which have been deposited thereon by the first assembly as retrieved from the molding machine 10. At that time the lead pallet 132 containing the molded articles or base curves 20 is advanced by the conveyor belt 50 so as to form a continuous line with preceding base curve-filled pallets 132 which are then transported into a suitable chamber (not shown) containing, for example, a nitrogen atmosphere. This cycle is then continually repeated in the same manner of operation, rendering the entire apparatus and process of molded article transport extremely simple in comparison with currently employed material handling systems.

(B) Transport of Front Curves by Apparatus

With regard to the second embodiment of the invention, as shown in FIGS. 13 through 16 of the drawings, in this instance any components which are identical or similar in construction and function with those described with regard to the first embodiment are identified by the same reference numerals.

Figure 3:
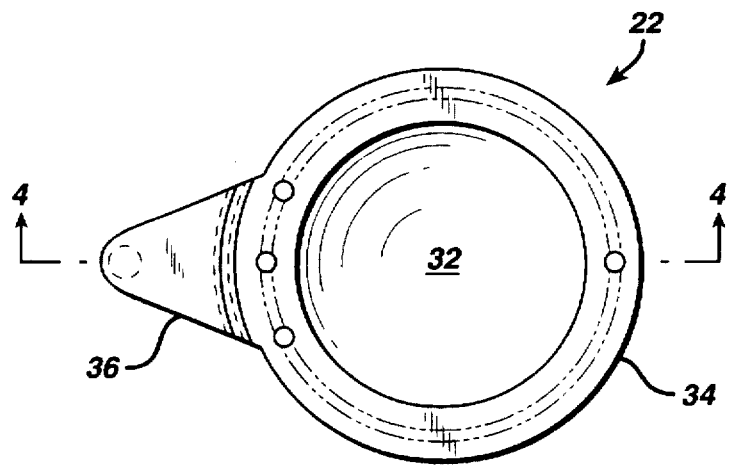
FIG. 3 illustrates a plan view of a front curve.
Figure 4:
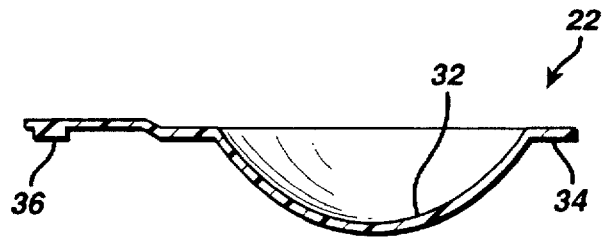
FIG. 4 illustrates a sectional view taken along line 4—4 in FIG. 3.

In this instance, the molded articles which are transported from the molding machine 10, rather than being base curves 20 are the front curves 22 of lens forming molds, as shown in FIGS. 3 and 4.

The first assembly 42, in this embodiment, is basically identical in its design and function as in the first embodiment described hereinbefore; however, the suction cups 70 may be slightly differently dimensioned, since the front curves 22 are removed from the molding machine 10 in a converse orientation to that of the base curves. Consequently, during their transport to the second location 52 from the first location 46, the molded articles or front curves are inverted by 180° about their plane.

As the vacuum head 64 is retracted from the mold elements 12, 14, and rotated into horizontal orientation prior to reaching the first location 46, rather than the molded articles 22 being deposited onto a nest 90 as the base curves are in the first embodiment, this nest 90 is rendered redundant and consequently is eliminated together with its operative structure, and the arm member 156 of the rotary parts handling system, comprising the rotatable and vertically reciprocable cam-controlled member 158, and which arm member 156 may be shorter in length than the arm member 112 of the first embodiment for depositing the articles on pallets on a conveyor belt 160 which is adapted to run in simultaneous operative parallel relationship with conveyor belt 50 of the first embodiment, mounts at its distal free end upwardly facing vacuum-supplied cup-shaped article receiving elements 162 on a head plate 164, which are adapted to be swung into a position for receiving the molded articles to the location where the nest 90 was previously located in the first embodiment. Consequently, as the horizontally oriented vacuum head 64 reaches that first location 46 with the front curves facing downwardly suspended from suction cups 70, the arm member 156 of the rotary cam-controlled member 158; i.e., the Cambot, is rotated 180° therebeneath about its longitudinal axis and then moved upwardly by member 158 into contact with the front curves 22, a vacuum being applied to the cups 162 on the arm member while the vacuum is released from the vacuum plate 64 and cups 70 and a slight superatmospheric pressure generated to produce a blow off condition enabling the arm member 156 to pick up the front curves by means of cups 162.

At that point, the arm member 156 is lowered by the Cambot member 158 and then swung horizontally 90° towards the conveyor belt 160 while the vacuum head 64 is again transported towards the molding machine 10 and rotated into a vertical standby orientation for receiving molded articles therefrom.

As the arm member 156 is swung towards the horizontal conveyor belt 160 supporting a plurality of pallets 170 for receiving therefrom the molded articles, in effect the front curves 22, the arm member 156 is rotatably inverted or flipped through an angle of 180° about its longitudinal axis so as to cause the front curves or molded articles retained on the cups 162 to face downwardly towards recesses 172 formed in the pallets 170. Thereafter, as the pallets are separated and advanced in sequence as in the first embodiment, the leading pallet is then raised by means of a lead in fixture as in the previous embodiment while in alignment with the arm member 156, the latter of which is then moved downwardly and the vacuum released in cups 162 so as to enable the front curves to be received in the recesses 172 of the pallet 170. The arm member 156 is thereafter raised by rotatable member 158 as the pallet 170 is advanced forwardly by a motor driving the conveyor belt in operative synchronism so as to form a succession of pallets containing front curves which are advanced into the nitrogen atmosphere-containing chamber (not shown). At that time, the arm member 156 which has been raised is again rotated or flipped through 180° so as to cause the front curve-transporting vacuum cups 162 to be oriented facing upwardly and to be in a position to receive a subsequent batch of front curves from the first assembly 42 as described hereinbefore. In essence, with the exception of the elimination of the nest 90 and the rotatable nature of the arm member 156 about its longitudinal axis so as to be able to invert the molded articles, the function and sequence of operation is identical as with that described with respect to the first embodiment which manipulates and transports the base curves 20.

(C) Transportation of Primary Packaging Base Members by Apparatus

With respect to the third embodiment as shown in FIGS. 17 through 22 of the drawings, again this is similar in operation to that of the first embodiment of the apparatus and wherein similar or the like components are identified by the same reference numerals.

Figure 5:
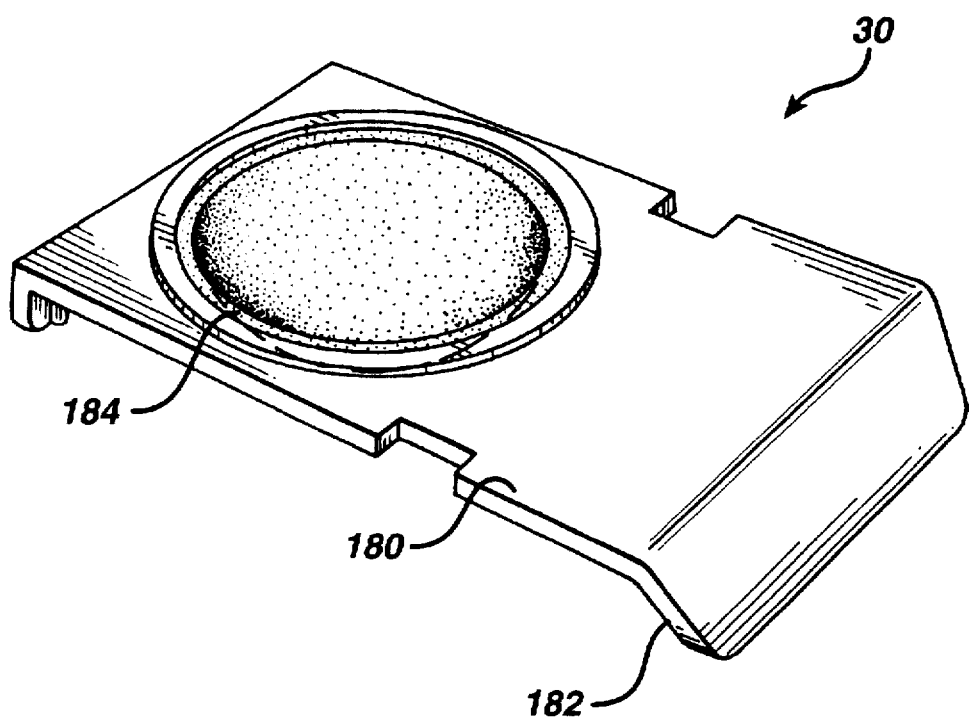
FIG. 5 illustrates a perspective view of a typical primary package base member.

In this instance, the molded parts, rather than being either the base or front curves 20, 22 which are utilized for molding the contact lenses, are those for producing base members 30 of the primary packages for the contact lenses, as shown in FIG. 5 of the drawings each of which, in this configuration, by way of example only, comprises a generally flat flange 180 and a depending tab 182 at one end thereof, and with a cavity 184 being molded in the flat flange 180 for receiving and sealingly storing a molded contact lens therein while immersed in an isotonic saline solution.

In this instance, the arm member 60 of the first assembly 42 mounting the vacuum plate 188 receives the molded components 30, such as by means of somewhat larger sized and spaced apart suction cups 190 in comparison with cups 70, and retracts these while being rotated through 90 degrees from a vertical orientation in the space between the mold elements 12, 14 into a horizontal orientation at the first location 46. These primary package or blister package base members 30 are then deposited onto a receiving nest arrangement 200, 202 each having an array of recesses so as to be able to receive two batches of molded parts 30 deposited in two passes of the arm member 60 in removing them from the molding machine 10. These nest arrangements 200, 202 are then hydraulically or pneumatically respaced through drive 213 by rotation about 90° and repositioning into 16×2 arrays in specific alignment so as to enable suction cups 210 positioned on head plate 212 at a free end of the pivotable arm 214 of a cambot or rotary parts handling member 216 to pick these up in reoriented arrangement in one passes and to deposit these parts 30 onto pallets 220 sequentially being advanced along the upper run of a conveyor belt 222. The conveyor belt 222 is also motor-driven by drive 223 in a manner similar to the preceding embodiments and the leading pallet 220 lifted at the second location 52, while the cambot lowers the arm member 214 and releases the vacuum in the cups 210 and generates a slight superatmospheric blow off condition so as to cause the molded articles 30 to be deposited onto recesses 230 in the pallets 220 for further advance towards a processing station, i.e., a nitrogen atmosphere-containing chamber.

As previously mentioned, each of the embodiments enables the first assembly 42 which removes the molded articles 20, 22, 30 from the molding machine to convey samples of the molded articles to a sampling/testing locale 240 upstream of the first location 46 so as to facilitate periodic testing and/or inspection of the molded articles which have been molded in the molding machine 10.

From the foregoing, it becomes readily apparent that the present embodiments of the molded parts transporting apparatus are simple in construction and in their function in comparison with previous or currently employed types of apparatus of this nature, and wherein the various transfer assemblies and transfer steps have been reduced in number, and in which the essential transport sequence is effected by means of a pivotable and rotatable arm system eliminating intermediate inverting and conveying systems heretofore required for the various molded articles.

Furthermore, the use of lightweight components for the transport and molded article pickup arms and the different elements forming the operative components also appreciably reduces and even eliminates any previous shocks and vibrations encountered during operation of the apparatus which would exert a deleterious effect on the quality of the articles being produced.

While there has been shown and described what are considered to be preferred embodiments of the invention, it will, of course, be understood that various modifications and changes in form or detail could readily be made without departing from the spirit of the invention. It is, therefore, intended that the invention be not limited to the exact form and detail herein shown and described, nor to anything less than the whole of the invention herein disclosed as hereinafter claimed.

What is claimed is:

1. An apparatus for removing and transporting ophthalmic lens fabricating mold sections from a molding installation; comprising:

(a) a first assembly for removing the lens fabricating mold sections from the molding installation and transporting the lens fabricating mold sections to a first location, said molding installation comprises two separable mold halves, said first assembly including means for imparting a transverse movement to said first assembly for accelerating and optimizing the rate of removal of said mold sections from said molding installation and for transporting said mold sections to said first location;

(b) a second assembly for receiving said molded sections at said first location and transporting said molded sections to a second location wherein said second assembly comprises pivotable arm means for retrieving said molded sections deposited by said first assembly at said first location and transporting said molded sections to said second location; and wherein said apparatus further comprises at said first location means for receiving said molded sections from said first assembly and for reorienting the molded sections into specific arrays prior to being retrieved by said second assembly.

2. An apparatus as claimed in claim 1, wherein said first assembly comprises:

(a) a first linearly reciprocable member including a head for receiving and releasably holding said mold sections;

(b) a second linearly reciprocable member movable in parallel relationship with said first linearly reciprocable member and being operably connected therewith so as to impart a predetermined variable linear rate of speed to said head between said molding installation and said first location; and (c) said means for imparting said transverse movement being connected to said first linearly reciprocable member imparting a movement thereto transversely of the reciprocable motion at predetermined intervals during the reciprocating linear travel of said head.

3. An apparatus as claimed in claim 2, wherein said head comprises a vacuum plate connected to a source for selectively providing a releasable vacuum and superatmospheric blow off pressure condition; a plurality of resiliently deformable vacuum cups mounted on said vacuum plate each communicating with said releasable vacuum source, each of said vacuum cups being engageable with respectively one said mold section for transporting said mold sections from said molding installation to said first location.

4. An apparatus as claimed in claim 3, wherein a motor operatively connected to said first linearly reciprocable member rotates said vacuum plate into a vertical orientation upon movement of said head into said molding installation and into a horizontal orientation upon movement of said head towards said first location.

5. An apparatus as claimed in claim 1, wherein drive means is operatively connected to one end of said pivotable arm means for imparting oscillatory movement to said arm means between said first and second locations, said drive means imparting vertical displacement to said pivotable arm means intermediate the oscillating end positions thereof to facilitate retrieval of the molded sections at said first location and depositing said molded sections by said pivotable arm means at said second location.

6. An apparatus as claimed in claim 5, wherein said pivotable arm means includes a vacuum head at a free distal end; resiliently flexible vacuum cups at said vacuum head communicating with a selectively releasable source of vacuum and superatmospheric blow off pressure, said vacuum cups each being engageable with respectively one of said molded sections for transporting said molded sections to said second location and depositing said molded sections at said second location.

7. An apparatus as claimed in claim 5, wherein said second location comprises transport means for conveying molded sections deposited by said pivotable arm means for further processing.

8. An apparatus as claimed in claim 7, wherein said transport means comprises a conveyor system; and pallets transportable by said conveyor system receiving said molded sections from said pivotable arm means.

9. An apparatus as claimed in claim 1, wherein said first assembly selectively conveys mold sections to a third location different from said first and second locations, said third location for testing samples of said mold sections.

10. An apparatus as claimed in claim 2, wherein said second linearly reciprocable member includes displacement means for displacing said head in a direction parallel with said reciprocable motion, and said means for imparting said transverse movement includes a rail structure for displacing said head perpendicular to said reciprocable motion.

11. An apparatus as claimed in claim 5, wherein said drive means and said pivotable arm means comprises a robotic structure, said pivotable arm means operates in synchronism with the functioning of said first assembly.

12. An apparatus for removing and transporting molded contact lens packaging articles from a molding installation; comprising:

(a) a first assembly for removing the articles from the molding installation and transporting the articles to a first location, said molding installation comprises two separable mold halves, said first assembly including means for imparting a transverse movement to said first assembly for accelerating and optimizing the rate of removal of said articles from said molding installation and for transporting said articles to said first location;

(b) a second assembly for receiving said articles at said first location and transporting said articles to a second location, wherein said second assembly comprises pivotable arm means for retrieving said articles deposited by said first assembly at said first location and transporting said articles to said second location; and wherein said apparatus further comprises at said first location means for receiving said articles from said first assembly and for reorienting the articles into specific arrays prior to being retrieved by said second assembly.

13. An apparatus as claimed in claim 12, wherein said first assembly comprises:

(a) a first linearly reciprocable member including a head for receiving and releasably holding said articles;

(b) a second linearly reciprocable member movable in parallel relationship with said first linearly reciprocable member and being operably connected therewith so as to impart a predetermined variable linear rate of speed to said head between said molding installation and said first location; and (c) said means for imparting said transverse movement being connected to said first linearly reciprocable member imparting a movement thereto transversely of the reciprocable motion at predetermined intervals during the reciprocating linear travel of said head.

14. An apparatus as claimed in claim 13, wherein said head comprises a vacuum plate connected to a source of a selectively releasable vacuum and superatmospheric blow off pressure; a plurality of resiliently deformable vacuum cups mounted on said vacuum plate each communicating with said selectively releasable vacuum source and superatmospheric blow off pressure, each of said vacuum cups being engageable with respectively one said article for transporting said articles under a vacuum from said molding installation to said first location.

15. An apparatus as claimed in claim 14, wherein a motor operatively connected to said first linearly reciprocable member rotates said vacuum plate into a vertical orientation upon movement of said head into said molding installation and into a horizontal orientation upon movement of said head towards said first location.

16. An apparatus as claimed in claim 16, wherein drive means is operatively connected to one end of said pivotable arm means for imparting oscillatory movement to said arm means between said first and second locations, said drive means imparting vertical displacement to said pivotable arm means intermediate the oscillating end positions thereof to facilitate retrieval of the articles at said first location and depositing said articles by said pivotable arm means at said second location.

17. An apparatus as claimed in claim 16, wherein said pivotable arm means includes a vacuum head at a free distal end; resiliently flexible vacuum cup at said vacuum head communicating with a selectively releasable source of vacuum and superatmospheric blow off pressure, said vacuum cups each being engageable with respectively one of said articles for transporting said articles under a vacuum to said second location, releasing said vacuum and generating said blow off pressure for depositing said articles at said second location.

18. An apparatus as claimed in claim 16, wherein said second location comprises transport means for conveying articles deposited by said pivotable arm means for further processing.

19. An apparatus as claimed in claim 18, wherein said transport means comprises a conveyor system; and pallets transportable by said conveyor system receiving said articles from said pivotable arm means.

20. An apparatus as claimed in claim 12, wherein said first assembly selectively conveys articles to a third location different from said first and second locations, said third location for testing samples of said articles.

21. An apparatus as claimed in claim 13, wherein said second linearly reciprocable member includes displacement means for displacing said head in a direction parallel with said reciprocable motion, and said means for imparting said transverse movement includes a rail structure for displacing said head perpendicular to said reciprocable motion.

22. An apparatus as claimed in claim 16, wherein said drive means and said pivotable arm means comprise a robotic structure, said pivotable arm means operates in synchronism with the functioning of said first assembly.

23. An apparatus for removing and transporting molded articles from a molding installation; comprising:

(a) a first assembly for removing the articles from the molding installation and transporting the articles to a first location, said molding installation comprises two separable mold halves, said first assembly including means for imparting a transverse movement to said first assembly for accelerating and optimizing the rate of removal of said articles from said molding installation and for transporting said articles to said first location;

(b) a second assembly for receiving said articles at said first location and transporting said articles to a second location, wherein said second assembly comprises pivotable arm means for retrieving said articles deposited by said first assembly at said first location and transporting said articles to said second location; and wherein said apparatus further comprises at said first location means for receiving said articles from said first assembly and for reorienting the articles into specific arrays prior to being retrieved by said second assembly.

24. An apparatus as claimed in claim 2, wherein a first motor is operatively connected to said means for imparting said transverse movement, and wherein a second motor is operatively connected to said second linearly reciprocable member.

25. An apparatus as claimed in claim 13, wherein a first motor is operatively connected to said means for imparting said transverse movement, and wherein a second motor is operatively connected to said second linearly reciprocable member.

* * * * *

UNITED STATES PATENT AND TRADEMARK OFFICE
CERTIFICATE OF CORRECTION

PATENT NO. : 5,895,192
DATED : April 20, 1999
INVENTOR(S) : Parnell, Sr., et al.

It is certified that error appears in the above-indentified patent and that said Letters Patent is hereby corrected as shown below:

Column 15, line 62 - delete "16" and insert --12--.

Signed and Sealed this

Seventh Day of September, 1999

Attest:

Q. TODD DICKINSON

*Attesting Officer*   *Acting Commissioner of Patents and Trademarks*

(12) REEXAMINATION CERTIFICATE (4483rd)
United States Patent
Parnell, Sr. et al.

(10) Number: US 5,895,192 C1
(45) Certificate Issued: Nov. 6, 2001

(54) APPARATUS AND METHOD FOR REMOVING AND TRANSPORTING ARTICLES FROM MOLDS

(75) Inventors: Philip King Parnell, Sr.; Michael Litwin; Victor Lust, all of Jacksonville, FL (US)

(73) Assignee: Johnson & Johnson Vision Products, Inc., New Brunswick, NJ (US)

Reexamination Request:
No. 90/005,884, Dec. 11, 2000

Reexamination Certificate for:
Patent No.: 5,895,192
Issued: Apr. 20, 1999
Appl. No.: 08/654,399
Filed: May 28, 1996

Certificate of Correction issued Sep. 7, 1999.

Related U.S. Application Data

(63) Continuation-in-part of application No. 08/431,884, filed on May 1, 1995, which is a continuation-in-part of application No. 08/258,267, filed on Jun. 10, 1994, now abandoned.

(51) Int. Cl.$^7$ ............................................. B65G 47/74
(52) U.S. Cl. .................... 414/225.01; 414/752.1; 414/226.01; 901/8; 198/409; 198/468.4; 198/468.9
(58) Field of Search ............... 414/225.01, 226.01, 414/729, 737, 744.5, 749.1, 752.1, 793, 797; 901/7, 8, 40; 198/409, 375, 432, 468.4, 468.9

(56) References Cited

U.S. PATENT DOCUMENTS

| | | |
|---|---|---|
| 3,542,224 | 11/1970 | Warren . |
| 3,973,795 | 8/1976 | Goransson . |
| 4,411,574 | 10/1983 | Riley . |
| 4,444,423 | 4/1984 | Montferme et al. . |
| 4,444,424 | 4/1984 | Lebret . |
| 4,495,313 | 1/1985 | Larsen . |
| 4,565,348 | 1/1986 | Larsen . |
| 4,571,320 | 2/1986 | Walker . |
| 4,640,489 | 2/1987 | Larsen . |
| 4,680,336 | 7/1987 | Larsen et al. . |
| 4,691,820 | 9/1987 | Martinez . |
| 4,795,124 | 1/1989 | Nagai . |
| 4,889,664 | 12/1989 | Kindt-Larsen . |
| 5,039,459 | 8/1991 | Kindt-Larsen . |
| 5,094,609 | 3/1992 | Kindt-Larsen . |
| 5,222,854 | 6/1993 | Blatt . |
| 5,234,328 | 8/1993 | Willson et al. . |
| 5,476,111 | 12/1995 | Andersen et al. . |
| 5,575,376 | 11/1996 | Colamussi . |
| 5,578,331 | 11/1996 | Martin et al. . |
| 5,681,138 | 10/1997 | Lust et al. . |
| 5,948,341 | 9/1999 | Diamond et al. . |

FOREIGN PATENT DOCUMENTS

| | | |
|---|---|---|
| 637491 | 2/1995 | (EP) . |
| 691195 | 1/1996 | (EP) . |
| 1092749 | 11/1967 | (GB) . |

*Primary Examiner*—Donald W. Underwood

(57) ABSTRACT

An apparatus and a method for removing and transporting articles from molds. More specifically, the present invention pertains to such an apparatus and method which is particularly well suited for removing the articles from a molding machine having molds in which they are molded, and thereafter carrying the articles within a very short period of time away from the molds and depositing the articles for further processing in a high speed, automated production system. The apparatus removes and transports articles, such as ophthalmic contact lens mold sections or contact lens packaging elements, from a molding station whereby an operating assembly removes the articles from the molding station and transports these in a composite motional displacement enabling rapid conveyance thereof to a first location; a pivotable robotic parts handling element being adapted to receive the articles from the first location and transport these to a further or second location for deposition onto pallets or the like and the continued transport thereof to a treatment or processing facility for producing and/or packaging of the contact lenses.

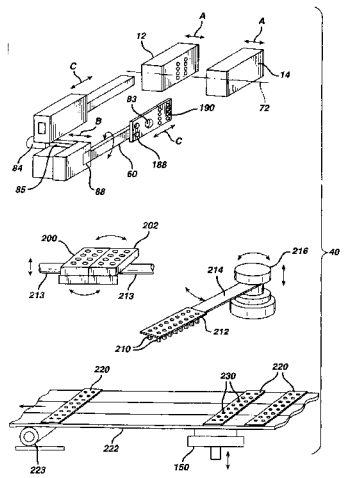

REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 1–25 is confirmed.

* * * * *